US011336463B2

(12) United States Patent
Salimi et al.

(10) Patent No.: US 11,336,463 B2
(45) Date of Patent: May 17, 2022

(54) INFORMATION ASSURANCE (IA) USING AN INTEGRITY AND IDENTITY RESILIENT BLOCKCHAIN

(71) Applicant: Accenture Global Solutions Limited, Dublin (IE)

(72) Inventors: Alireza Salimi, Reston, VA (US); Benjamin Glen McCarty, Washington, DC (US)

(73) Assignee: Accenture Global Solutions Limited, Dublin (IE)

( * ) Notice: Subject to any disclaimer, the term of this patent is extended or adjusted under 35 U.S.C. 154(b) by 247 days.

(21) Appl. No.: 16/545,687

(22) Filed: Aug. 20, 2019

(65) Prior Publication Data

US 2020/0235943 A1   Jul. 23, 2020

Related U.S. Application Data

(60) Provisional application No. 62/795,898, filed on Jan. 23, 2019.

(51) Int. Cl.
*H04L 29/06* (2006.01)
*H04L 9/00* (2022.01)
*H04L 9/32* (2006.01)
*G06F 8/65* (2018.01)
*H04L 9/06* (2006.01)

(52) U.S. Cl.
CPC ............. *H04L 9/3263* (2013.01); *G06F 8/65* (2013.01); *H04L 9/006* (2013.01); *H04L 9/0637* (2013.01); *H04L 9/0643* (2013.01); *H04L 2209/38* (2013.01)

(58) Field of Classification Search
CPC ..... H04L 9/3263; H04L 9/006; H04L 9/0643; H04L 9/0637; H04L 2209/38; H04L 9/0891; H04L 9/0894; H04L 9/3247; H04L 9/3239; G06F 8/65
See application file for complete search history.

(56) References Cited

U.S. PATENT DOCUMENTS

2004/0153670 A1*  8/2004  Casey ............... H04N 21/6587
                                                          726/10
2012/0274444 A1* 11/2012  Micali ..................... G07C 9/22
                                                         340/5.65

(Continued)

FOREIGN PATENT DOCUMENTS

WO    WO 2017/191472 A1    11/2017
WO    WO-2017191472 A1 *  11/2017  .......... H04L 61/1511

OTHER PUBLICATIONS

Office Action issued on European application 19209938.0 dated Dec. 22, 2020, 4 pages.

(Continued)

*Primary Examiner* — Jorge L Ortiz Criado
*Assistant Examiner* — Kevin Ayala
(74) *Attorney, Agent, or Firm* — Crowell & Moring LLP

(57) ABSTRACT

A system for providing secure access to digital resources is provided that utilizes a blockchain platform. Using this blockchain platform, digital resource vendors create new digital tracking ledgers for their digital resource products such that updates to the digital resource products are accessible directly from a blockchain. Accordingly, these updates are deliverable in a protected and secure manner to consumers of the digital resources.

18 Claims, 7 Drawing Sheets

(56) References Cited

U.S. PATENT DOCUMENTS

2015/0310219 A1* 10/2015 Haager ................ G06F 21/62
                                                    713/165
2018/0176229 A1*  6/2018 Bathen ............... H04W 12/106
2020/0374700 A1* 11/2020 Smith ................. H04L 9/3247

OTHER PUBLICATIONS

Extended European Search Report in Europe Application No. 19209938.0, dated May 14, 2020, 8 pages.
Boudguiga et al., "Towards Better Availability and Accountability for IoT Updates by Means of a Blockchain", 2017 IEEE European Symposium on Security and Privacy Workshops (EUROS&PW), IEEE, dated Apr. 26, 2017, pp. 50-58, XP033114038.

* cited by examiner ial Patent
INFORMATION ASSURANCE (IA) USING AN INTEGRITY AND IDENTITY RESILIENT BLOCKCHAIN

CROSS-REFERENCE TO RELATED APPLICATION(S)

This application claims benefit to U.S. Provisional Patent Application No. 62/795,898, filed on Jan. 23, 2019, the entirety of which is hereby incorporated by reference herein.

TECHNICAL FIELD

A digital blockchain data structure and a process for using the blockchain in combination with an authoritative domain name server (DNS) and other verification techniques are disclosed for securely providing access to trusted digital resources.

BACKGROUND

Software developers provide software updates from time to time to update features and/or fix known issues in their software products. The software updates are known to be distributed by software developers in a number of ways, including an option for software updates to be downloaded from a data holding site made accessible to clients via the Internet. While this option offers great convenience, the online sites themselves are vulnerable to security attacks and the clients attempting to download their software updates from such online sites may be exposing themselves to security risks. For example, there is a risk that an unauthorized party has gained access to the site and replaced the authenticated software update with a malicious version that includes unauthorized code. Such unauthorized code may not be detected by either the software developer or client, which leaves a party exposed to unintended risks such as external cyber-attacks to their computer device where the unauthorized code has been downloaded.

DETAILED DESCRIPTION

Figure 1:
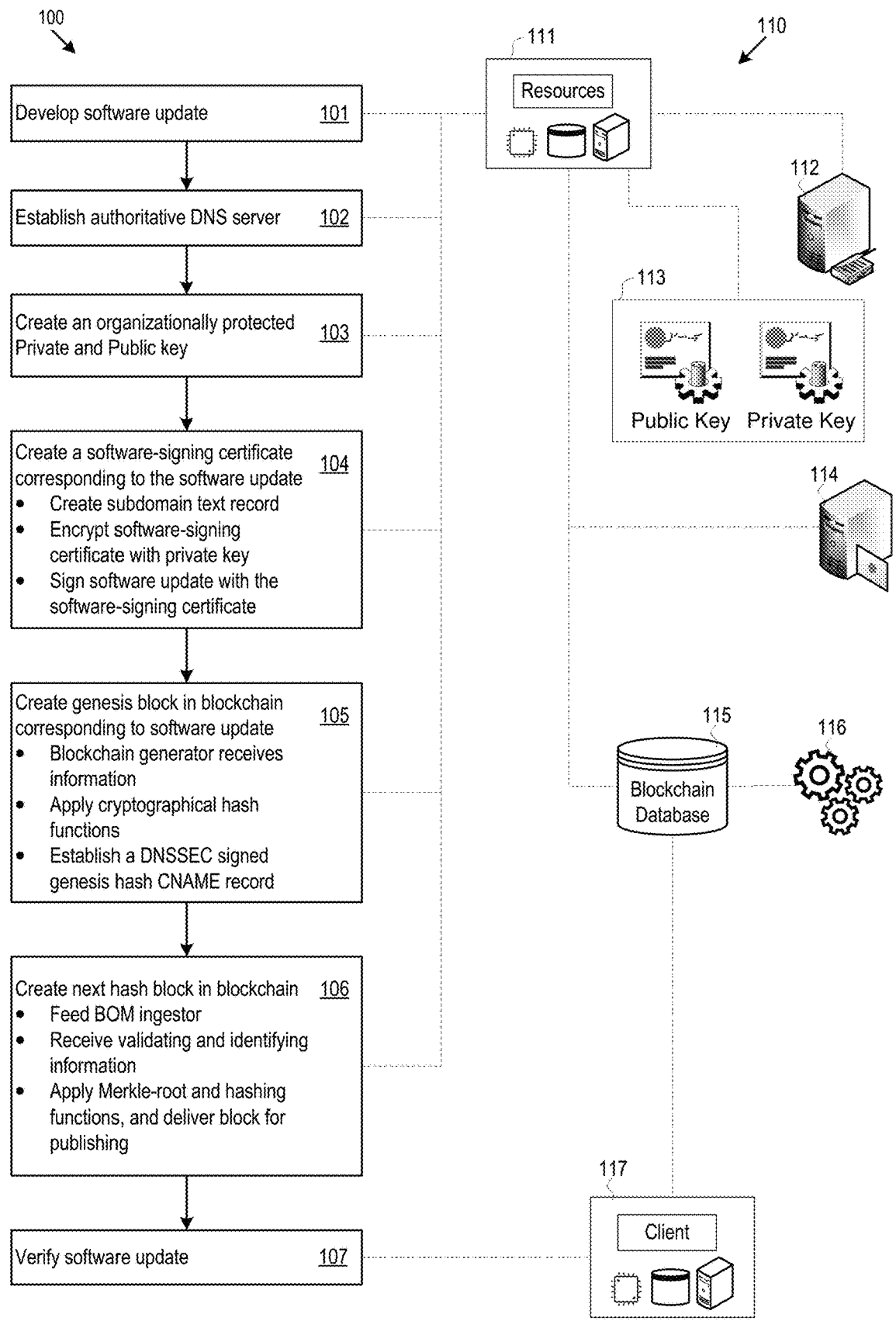
FIG. 1 shows an exemplary flow diagram and corresponding secure software access system for implementing secure software update access, according to some embodiments.

According to some embodiments, a computing system is disclosed that comprises a record keeping server configured to store a digital record for a software update, and a computing device. The computing device may be comprised of an authentication circuitry configured to generate a public key corresponding to a software developer of the software update, generate a private key corresponding to the software developer of the software update, establish a software-signing certificate corresponding to the software update, and electronically sign the software update with the software-signing certificate. The computing device may further comprise a blockchain generation circuitry configured to generate a genesis block that initiates a blockchain, and generate a block for the blockchain, wherein the block is configured to include: a hashed list of components comprising a digital resource, a hashed data file corresponding to data associated with the digital resource, and a hashed resource file corresponding to at least a portion of the digital resource. The record keeping server may be further configured to: receive the blockchain from the computing device, and publish the blockchain.

According to some embodiments, a method is disclosed comprising storing, by a record keeping server, a digital record for a software update, generating, by an authentication circuitry, a public key corresponding to a software developer of the software update, generating, by the authentication circuitry, a private key corresponding to the software developer of the software update, establishing, by the authentication circuitry, a software-signing certificate corresponding to the software update, electronically signing, by the authentication circuitry, the software update with the software-signing certificate, generating, by a blockchain generation circuitry, a genesis block that initiates a blockchain; and generating, by the blockchain generation circuitry, a block for the blockchain. The block may be configured to include: a hashed list of components comprising a digital resource; a hashed data file corresponding to data associated with the digital resource; and a hashed resource file corresponding to at least a portion of the digital resource. The method may be further configured to comprise receiving, by the record keeping server, the blockchain from the blockchain generation circuitry; and publishing, by the record keeping server, the blockchain.

According to some embodiments, a computing device is disclosed comprising a machine-readable medium, other than a transitory signal, and instructions stored on the machine-readable medium, the instructions configured to, when executed, cause processing circuitry to: store, in a record keeping server, a digital record for a software update, generate a public key corresponding to a software developer of the software update, generate a private key corresponding to the software developer of the software update, establish a software-signing certificate corresponding to the software update, electronically sign the software update with the software-signing certificate, generate a genesis block that initiates a blockchain, and generate a block for the blockchain. The block may be configured to include: a hashed list of components comprising a digital resource, a hashed data file corresponding to data associated with the digital resource, and a hashed resource file corresponding to at least a portion of the digital resource, and publish the blockchain.

In a blockchain data structure, participants, e.g., clients, terminals, or other participating nodes, may append data blocks to a blockchain. Executable code that controls the operation of the blockchain, may implement multiple mechanisms that control append operations to the blockchain to be compliant with one or more distributed ledger technologies (DLTs). A DLT may include a collection of one or more blockchain features that are adopted in the blockchains that are compliant with the DLT. One mechanism may include a hash structure that, for example, may include a self-referential scheme that may help prevent evidenceless tampering with the blockchain content.

In addition or alternatively, executable code may be configured to implement a consensus mechanism that facilitates determination of which blocks and what content may be rightly appended to the blockchain. Additionally or alternatively, the executable code may be configured to define a format of the blocks (e.g., the size, number, and name of fields; the format of tracked assets; or other formatting parameters; appended files) that may be appended to the blockchain.

The current existing solution for software integrity is dependent on verification of a single software-signature and/or applying an expected hash of the software, as distributed on open-sources. These existing solutions have been attacked with stolen certification, hash collisions, man-in-the-middle attacks, or other integrity compromises.

A solution is provided here that technically mitigates spoofing, tampering, non-repudiation, and other attacks against the software author, or the software, or the distribution source(s)/transport of the software. The solution calls for a blockchain platform, where product vendors create new digital tracking ledgers and corresponding blockchain for each software product, so these updates to the software products can be delivered in a protected and secure manner to clients of the software.

A secure software access environment (SSAE) system is provided where software updates may be downloaded securely by utilizing the authentication technology found in blockchain data structures. In particular, secure downloading of software updates is achieved by having the software developers directly integrate the software updates into a blockchain data structure. This way, any party wishing to access the software update will access it through the blockchain, where the blockchain provides both the software update while also tracking each instance of the blockchain being accessed. Thus the SSAE system creates a software inventory and baseline with cached update paths for convenient discovery, restoration and delivery of software updates.

To achieve these features, the SSAE system may include an authoritative domain name service (DNS) server being utilized as an identity source to track and identify the blockchains being created to store the software updates. In particular, an authoritative DNS server may store the records that identify a blockchain's corresponding keys, signatures, and/or file hashes. The authoritative DNS server may be a private server operated by the software developer to track and identify the blockchains being used to distribute their software updates. As each software update may be uploaded to their own corresponding distinct blockchain (e.g., their own "shortchain"), the authoritative DNS server may track and identify each of these shortchains.

The DNS records that are stored on the authoritative DNS server may also be encrypted with a private key, where the corresponding public key is published in the blockchain. These private-public key pairs serve to cryptographically and logically prove that the author and owner of the DNS records (e.g., the software developer), the software signature (e.g., software signature associated with the software developer), and the keys (e.g., keys corresponding to the software developer) are all directed to the same entity (e.g., the software developer). This interdependent distribution of verifying components comprising the SSAE system further crypto-proofs the data (e.g., the software update) and prevents an adversary from compromising the SSAE system without necessarily compromising the entire system.

The SSAE system may further use DNS identification features, blockchain identification features, and/or domain-validated (DV) certificates as an interlocking distributed private/public key infrastructure that references each other in a co-dependent decryption process before blockchain hashes can be cryptographically verified. By utilizing multiple segmented systems and encryptions/verification techniques, the SSAE system is more resilient to attacks by an adversarial party having gained access to merely one or a few accounts.

The SSAE system may further use corresponding hash types (e.g., SHA-0, SHA-1, SHA-2, SHA-224, SHA3-224, SHAKE-256, or the like) which can be used together as DNS subdomain labels that reinforce hash integrity and validate blockchain header hashes by dual-sourcing it. (e.g., 6367c48dd193d56ea7b0baad25b19455e529f5ee. 026727ec105a060b02a0086a2181748f6b9ac3cea3fc347 ca8675984.5c69bb695cc29b93d655e1a4bb5656cda624 080d686f74477ea09349.example.com). For example, according to RFC 1035 for DNS, each subdomain can be up to 62 characters long. As SHA-256 is 65 characters long, the use of the SHA-256 hash may be replaced with a SHAKE-256 hash as SHAKE-256 offers variable length hash-output which allows for the request of a 62 character hash and it is cryptographically sound. Following this technique, the SSAE system identifies the software update and/or software developer using the DNS records, instead of directly relying on blockchain properties.

The SSAE system may further use the bill of materials, or "BOM"—an "ingredient" list of the source-code/libraries/resources that make up the software update—as a cryptographic reference in the blockchain to further validate the integrity of the software and its supply-chain. The BOM generated by the SSAE system may include a list of source files and/or other software components that comprise the software update. Along with the BOM, the SSAE system may generate a hash of the BOM, which may be of the list of source files and/or other software components that comprise the software update and/or the actual raw source code of those files/components. By providing the BOM and hash, the SSAE can provide both transparency (by disclosing the list of source files) and increased security (the hash allows the software developer to protect the actual raw source code of the software updates being provided).

The SSAE system may further utilize multiple independent "shortchains", rather than a single large blockchain, to cover the software and each software update. Each shortchain corresponds to its own distinct software update. For example, this solves the desire to skip to the most recent software update without downloading all previous updates in the blockchain, by having multiple uniquely labeled shortchains with the digital identity of the software update embedded in the shortchain without skipping any cryptographic verification of the chain.

So the SSAE system utilizes a specific type of blockchain format (e.g., a shortchain) that provides software updates in its own distinct chain, thus allowing a client who only needs to download a specific software update to download the corresponding shortchain instead of having to download a much larger blockchain encompassing the entirety of the software suite or entirety of the software updates, which would be a much larger undertaking that depletes a large amount of computing resources. The shortchain solution is still more efficient from a resource conservation standpoint than skipping chains in a larger blockchain, because the skipping solution still requires the creation and parsing of a single large blockchain to find the desired chain links corresponding to the desired software update. With the shortchain solution, each update is its own distinct short chain with a unique genesis block identifying the particular software update, thus vastly conserving on the computing resources needed to identify and traverse the corresponding shortchain of the desired software update.

With these features, digital resources and update paths may be provided in a distributed blockchain. This way, an entity looking to download digital resources (e.g., software or software upgrades) may identify and verify the source (i.e., author) of the digital resource being downloaded. For example, when software is being downloaded, the entity may verify the software's integrity and authenticity. This protects entities from using unsafe, poisoned, compromised, hijacked or otherwise inauthentic malicious software in their environment.

FIG. 1 illustrates an exemplary flow diagram 100 describing a process for providing secure software update access, and a corresponding secure software access environment (SSAE) system 110 for providing the secure software update access. The SSAE system 110 includes a software developer computing system (SDCS) 111 comprised of various computing resources such as, for example, software, hardware, middleware, application programming interface (API), circuitry, and/or any other components for implementing the corresponding features attributed to the software developer (e.g., software developer "xyz"). The SSAE system 110 further includes an authoritative DNS server 112, a key generation server 113, a certificate generation server 114, a blockchain database 115, blockchain oracles 116, and a client 117 (e.g., client device) for accessing the blockchains stored in the blockchain database 115.

According to the flow diagram 100, at 101 the software developer creates a software update. For exemplary purposes, the source code corresponding to the software update may be referred to as "hello.py", while the executable code corresponding to the software update may be referred to as "hello.exe". The software update may be created on the platform provided by the SDCS 111.

Although the description describes a software update, the software update may be representative of any digital data items that may be distributed to clients. For example, the digital data item may be digital News articles, e-books, videos, media and/or any published digital content which may undergo updates, revisions, appending, and/or has an associated BOM, may be suitable for this solution offered by the SSAE system 110. For non-software types of the digital data items, the SSAE system 110 may replace the CPE field described herein with a universally unique identifier (UUID) of the digital data item and the potential loss/substitution of the AuthentiHash as appropriate for each specific example.

In a digital news article example, the digital news article's BOM may be composed of one or more of the following listing items: a headline, byline, media (pictures/video/audio), text, publish date, author(s), and/or source(s)/reference(s). In the case of a digital news article, threat actors may want to forge fake news-articles by a newspaper, or deceptively tamper with the integrity of an existing digital news article to perform disinformation attacks or even embed malicious software inside the news media content. A digital content publisher can mitigate these types of attacks by utilizing the distributed ledger technology of the SSAE system 110 designed with the verification techniques for consumers to securely access the trusted digital resource.

At 102, the software developer establishes its own authoritative DNS server 112 for storing DNS records that identify and track blockchains corresponding to the software developer within the SSAE system 110. In establishing its own authoritative DNS server 112, the software developer may utilize Domain Name System Security Extensions (DNSSEC) and/or DNS-based Authentication of Named Entities (DANE). For exemplary purposes, the software developer may be identified as "xyz.org" in the DNS records stored on the authoritative DNS server 112.

At 103, the software developer creates an organizationally protected private and public key pair which will be used for DNS record encryption and insertion into the corresponding blockchain. The private and public key pair may be created on the key generation server 113, which according to some embodiments may be part of a distinct computing device, or according to some embodiments may be included as part of the components comprising the SDCS 111.

At 104, the software developer creates a software-signing certificate that corresponds to the digital identity name of the software update that will be signed with the certificate. The certificate may be created using a trusted certificate authority (CA). According to some embodiments the CA may be running on the certificate generation server 114 as shown in FIG. 1, or according to some embodiments the CA may be running as part of an available feature on the SDCS 111. The software-signing certificate is attached to the software update, and is expected to be trusted by a client based on a trustworthiness of the CA.

According to the certification creation process, the software vendor creates a subdomain text record of the digital identity name of the software update. For example, the digital identity may be "hello-world-software.xyz.org" to correspond to the software update and the software developer. The software vendor further encrypts the software-signing certificate with the previously created private-key. The software vendor then signs the software update using the software-signing certificate that has been encrypted with the private-key.

Up to this point, the described process may be considered prerequisites to a subsequent blockchain creation process that will be described in more detail. The blockchain components described herein, such as a genesis block and subsequent blocks that comprise the total blockchain, may be created by a blockchain generator included as a component of the SDCS 111. The blockchain generator may be comprised of software, hardware, middleware, application programming interface (API), circuitry, and/or any other components for implementing the corresponding features attributed to the blockchain generator.

At 105, the software developer creates a genesis block of the blockchain corresponding to the software update. The creation of the genesis block is made through protected access and authentication controls with blockchain oracles 116 to create the new shortchain corresponding to the specific software update. The genesis block may be stored on the blockchain database 115.

Figure 2:
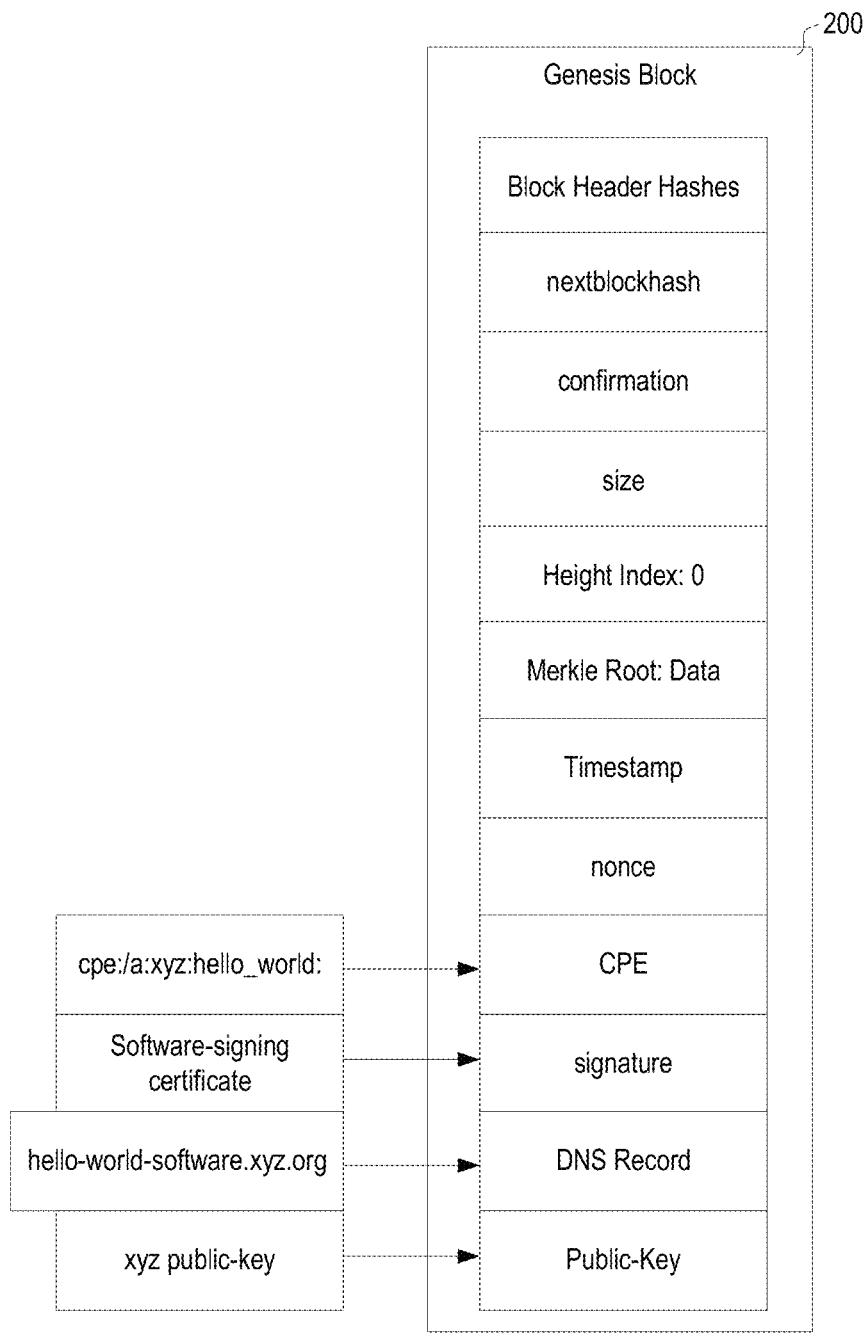
FIG. 2 shows an exemplary genesis block of a blockchain created according to some embodiments.

FIG. 2 shows an exemplary genesis block 200 created by the software vendor to include the exemplary information for describing the software update. For example, the genesis block 200 receives a common platform enumeration (CPE) schema (e.g., each software update may be digitally identified according to its own CPE schema such as "cpe:/[part]:[vendor]:[product]:[version]: . . . ") that uniquely and correctly labels the software update, and stores it in the CPE field of the genesis block 200. In the genesis block 200, the CPE field is shown to receive the exemplary CPE information: "cpe:/a:xyz:hello_world:". The genesis block 200 also includes a signature field which includes the software-signing certificate that has been encrypted with the private-key, as received from the software developer described herein. The genesis block 200 also includes a DNS record field which includes the digital identity name of the software update, as received from the software develop. In the genesis block 200, the DNS record field is shown to receive the exemplary DNS record information: "hello-world-software.xyz.org". The genesis block 200 also includes a public-key field that includes the public-key, as received from the software developer described herein. The genesis block 200 may be stored in the blockchain database 115.

The blockchain generator may use three different cryptographical hash functions whose output each is less than sixty two (62) characters (e.g., MD5, SHA-1, NTLM) to hash the genesis block 200 and the Merkle Root of the genesis block 200, and set this as the DNS record of the software update. Although three different cryptographical hash functions are utilized in the exemplary embodiments, other embodiments may find the blockchain generator using another predetermined number of cryptographical hash functions.

So with the genesis block 200, the software developer establishes a DNSSEC signed genesis hash canonical name record (CNAME record) using subdomains of the three different cryptographical hash functions that point to the subdomain text record of the digital identity name of the software update created earlier.

Figure 3:
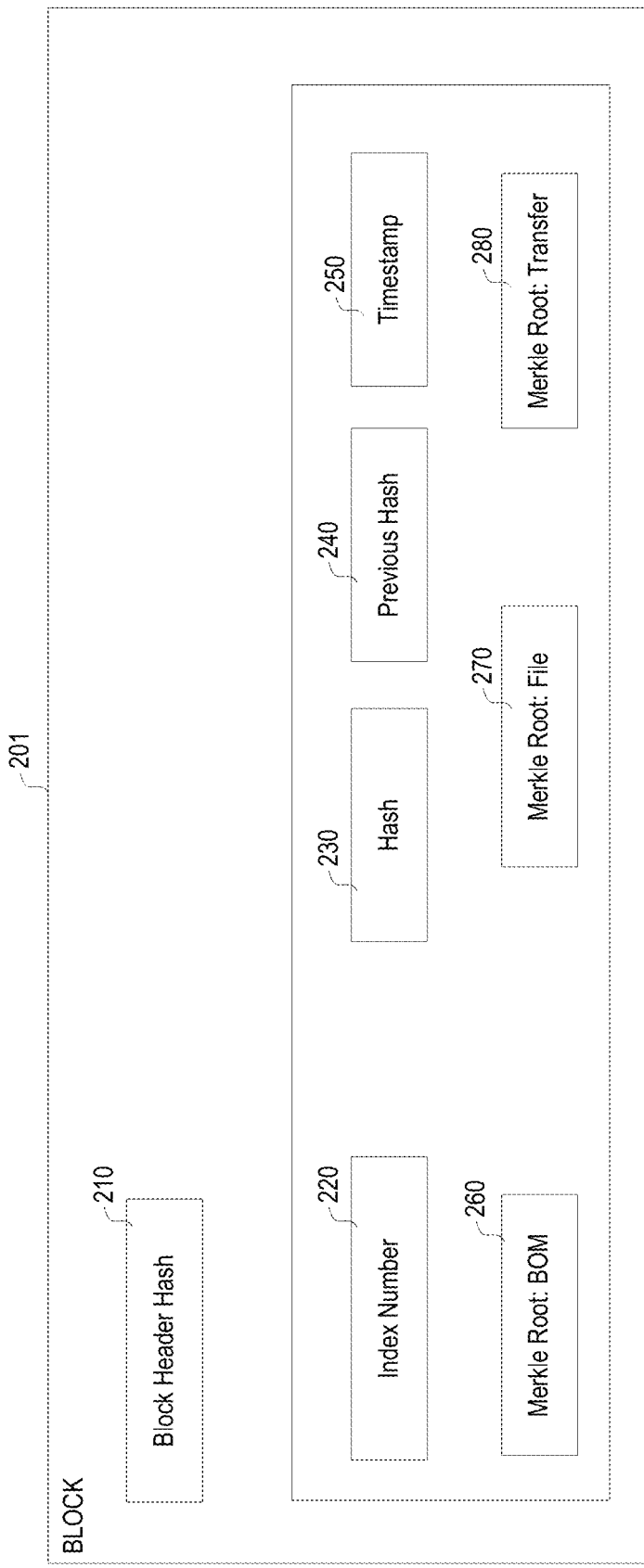
FIG. 3 shows an exemplary blockchain portion, according to some embodiments.

At 106, the blockchain generator creates a next-hash-block in the blockchain being created for the software update. The next-hash-block stores the data of the actual software update that is being protected by the software developer. According to some embodiments, a number of additional subsequent next-hash-blocks may be created to further store the data of the actual software update. FIG. 3 shows an exemplary block 201 that may be created by the blockchain generator at 106. Block 201 includes a block header hash 210, an index number 220, a hash identification 230, a previous hash identification 240, a timestamp 250, a Merkle Root: BOM field 260, a Merkle Root: File field 270, and a Merkle Root: Transfer field 280.

In creating the next-hash-block, the blockchain generator includes a bill of material (BOM) ingestor for ingesting hashes of the software update (e.g., the raw source code, files, resources and/or other components comprising the software update), and creating a BOM that lists the components comprising the software update. So each component is hashed along with its file to create the list of components included in the BOM.

Figure 4:
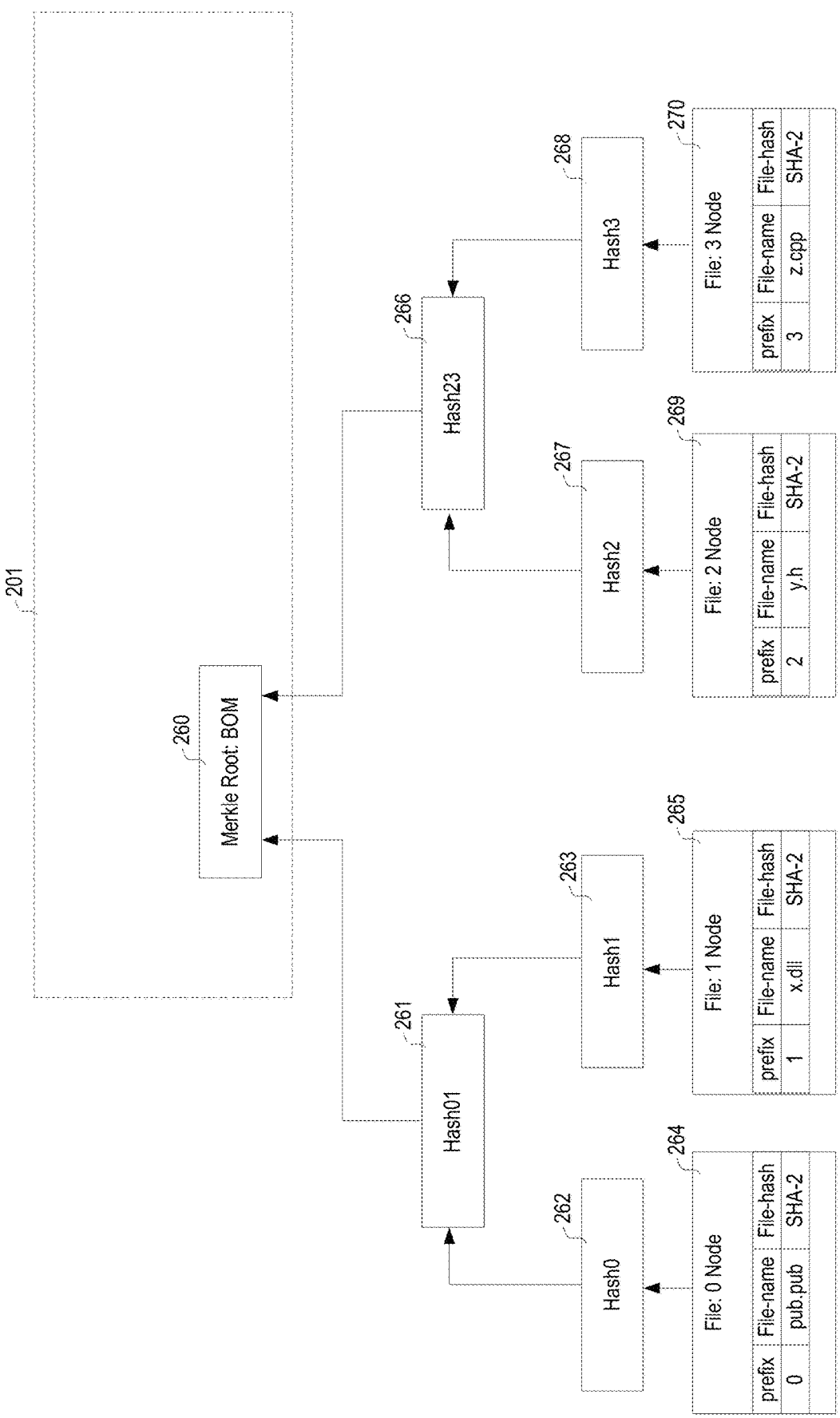
FIG. 4 shows exemplary components to a blockchain portion, according to some embodiments.

An exemplary hashing function implemented by the BOM ingestor is shown in FIG. 4. As shown in FIG. 4, the software update is represented by four unique file nodes 264, 265, 269, 270. Each of the files nodes 264, 265, 269, 270 correspond to a component of the software update, and are identified by their respective prefix, respective file name, and respective hashing function being applied. The hashing function shown in FIG. 4 also depicts a first level hash 262, 263, 267, 268, and a second level hash 261, 266 that is ingested by the BOM ingestor to fill in the hash value stored in the Merkle Root: BOM field 260.

The BOM ingestor creates the BOM to protect the software update from having malicious files added to it, or having malicious modifications applied to it, before the software update can be compiled by allowing the software developer to re-compile the component files listed in the BOM and compare whether the final results match with an expected output when using the known components of the software update as inputs. The BOM ingestor also protects against a compromised compiler threat, by allowing the software developer (i.e., the authoring entity) to recompile the same files with an alternate compiler to see if it produces the same results as the date in the "file" root.

In comparison to other digital resource downloading systems where a source-code of the software is disclosed, the blockchain generator in the SSAE system 110 uses an air gapped BOM ingestor, with hashes of the source-files rather than the full source code itself. This allows an entity to validate the source-to-binary code in a safeguarded sandbox without disclosing the actual source code, while still documenting supply-chain software components in a transparent manner. This distinction is important for classified software or trade-secreted software that may not be otherwise protected by intellectual property rights. In addition, by having an air gapped BOM ingestor, this prevents threat actors from performing remote unauthorized software publication/update-pushes to the blockchain being created for the software update.

Figure 5:
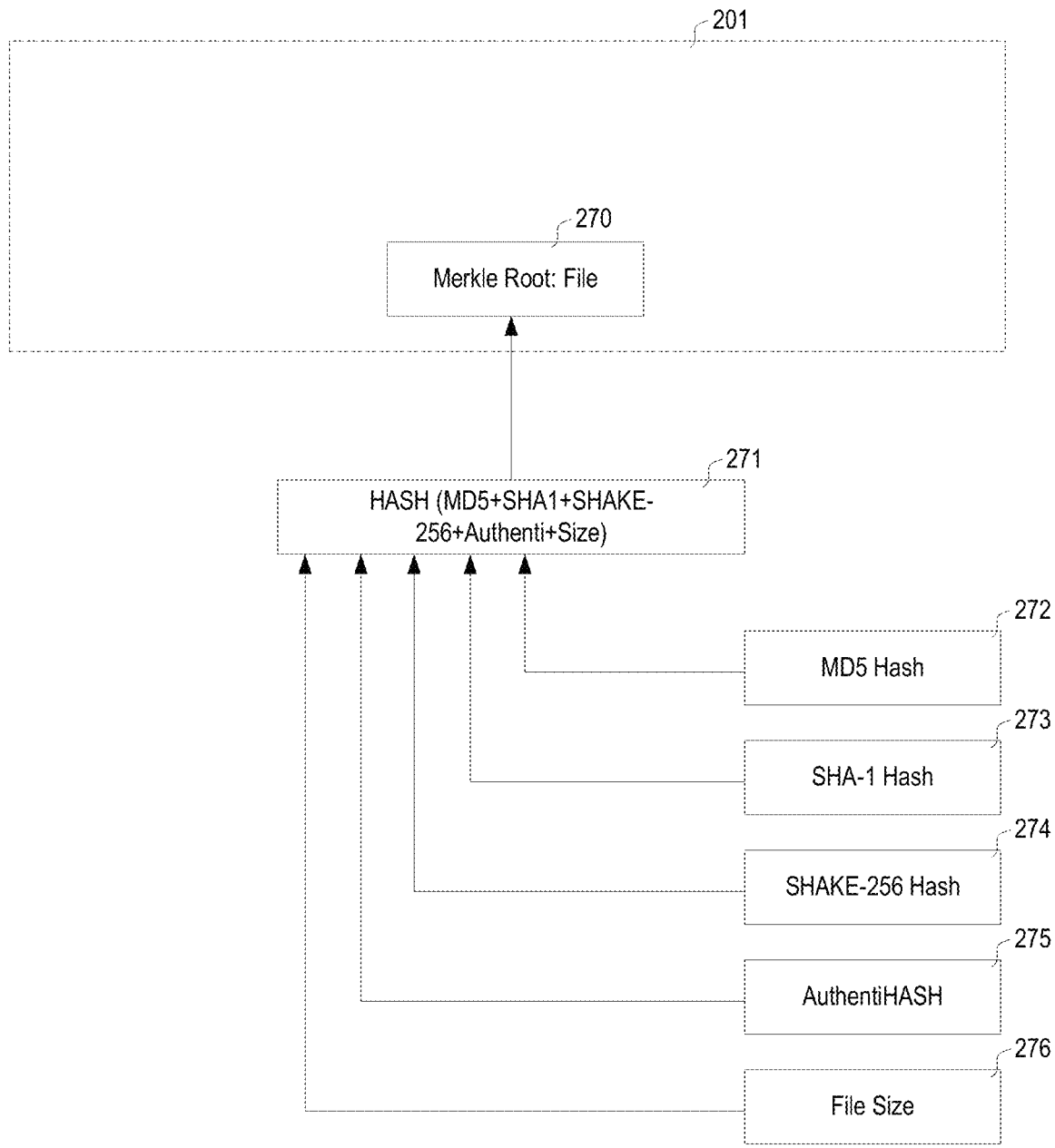
FIG. 5 shows exemplary components to a blockchain portion, according to some embodiments.

In creating the blockchain at 106, the blockchain generator receives the software developer's cryptographic signature, and other interlocking security that validates and identifies the software update. The blockchain generator then uses the received data to generate a hash value that will be stored in the Merkle Root: File field 270. For example in FIG. 5, the blockchain generator is shown receive the AuthentiHASH data 275 (e.g., the software-signing certificate created by the software developer) and the file size data 276 of the software update file being stored in the block 201. The blockchain generator also has identified three hash functions 272, 273, 274. With this set of received information, the blockchain generator generates the hash value 271 based on a hashing of the three hash functions 272, 273, 274, the AuthentiHASH data 275, and the file size data 276. The blockchain generator then stores the hash value 271 into the Merkle Root: File field 270. By hashing the received data in this way, the software developer makes it very difficult for an adversary to replace the software update file with a malicious file having the same multiple hash collisions using the same file size. The hash value 271 corresponding to the software update file also prevents an adversary from modifying the file bytes in the block 201 without causing a cryptographic failure.

Figure 6:
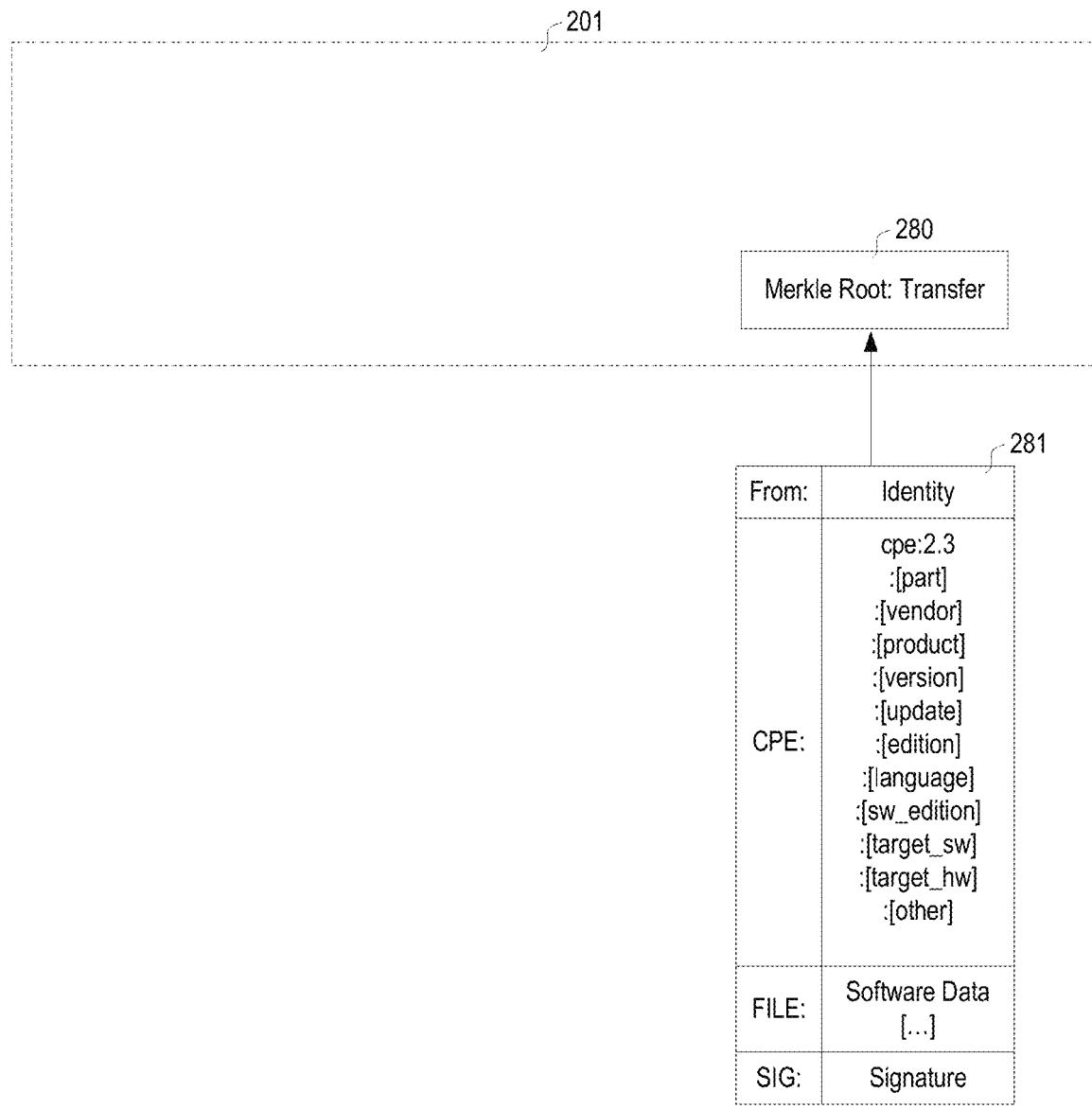
FIG. 6 shows exemplary components to a blockchain portion, according to some embodiments.

In creating the blockchain at 106, the blockchain generator creates the block 201 to directly include all the components of the software update (e.g., software metadata and actual software files) received by the blockchain generator. For example as seen in FIG. 6, the blockchain generator includes the actual compiled software update file(s) within the Merkle Root: Transfer field 280. The raw data stored in the Merkle Root: Transfer field 280 should directly correspond to the characteristics of the software update file stored in the Merkle Root: File field 270. As shown by the transfer data 281 shown in FIG. 6, the transfer data 281 may include the CPE schema for uniquely and correctly labeling the embedded software update file, the software update file itself, and the respective software-signing certification of the software developer. The identity information in the transfer data 281 corresponds to the authoritative DNS record for the software developer (e.g., xyz.org) with the multi-hash header in the genesis block 200 of the blockchain, where the genesis block 200 is identified by having an index value of 0 within the blockchain. The software-signing certification included in the transfer data 281 is the same one used to sign (i.e., certify) the software update, and is encrypted by the private key corresponding to the software developer. The encryption of the software-signing certificate can only be decrypted by the public-key stored in the genesis block 200 of the blockchain.

In creating the blockchain at 106, the blockchain generator delivers the block 201 to the blockchain oracles 116 to be published. The DNS records corresponding to the block 201 include the private-public keys, software-signing certificates, and file hashes of the block 201, and are published by the blockchain oracles 116 in the software developer's authoritative DNS server 112.

The authoritative DNS records are utilized to prove the identity of the software developer from the DANE DNSSEC to prevent DNS poisoning and/or hijacking, and also utilized to prove ownership of the software developer's digital identity (e.g., xyz.org). The authoritative DNS records are also encrypted with the private-key, where the public-key is stored in the genesis block 200. The private-public key pairs are utilized to cryptographically and logically prove that the author and owner of the authoritative DNS server and/or records, the software-signing certificate, and the private-public keys are the same entity. In this way, the SSAE system 110 is designed to fail when a single link is broken.

At 107, the client 117 of the software developer receives the specific blocks in the shortchain corresponding to the desired software update. The client 117 utilizes the DNS records, private-public key pairs, and cryptography described herein to verify the identity, source, and integrity of the software update included in the shortchain.

After verifying the cryptographic proofs of the available information in the shortchain, the client 117 is able to access the software update stored on the shortchain and execute it to update their corresponding software. The client 117 may also be given authority by the software developer to store the shortchain itself to serve as an offline backup copy of the software update that maintains its security features.

In comparison to other digital resource downloading systems where adversaries will use compromised software as long as the opportunity exists, the SSAE system 110 lists every source file as part of the blockchain record, including its name and hash that are used to build the binary. This distinction is important because it allows for the identification of new files, or changes in files, which will require differentiation and validation by the software developers that they account for, and validation of every single change in the file(s) before they are allowed to be verified and published to the blockchain. The blockchain by nature will also record file and hash differences between update versions based on this source file list creating an audit trail of software development changes.

Some other known digital resource downloading systems allow entities to skip downloading all updates in a software product's history and go directly to the newest software version in a blockchain and rely on previously verified identity "notarizations" earlier in the blockchain to skip to the newest one without fully "proving" its cryptographic validity. However, allowing entities to skip through the historical software updates opens up opportunities for hash-collision attacks and/or Forked-Chain attacks on the system which could be compromised/spoofed without downloading the whole chain. In contrast, the SSAE system 110 does not allow for such skipping. Instead the SSAE has multiple independent shortchains for each software update. Each shortchain is labeled with its own unique Common Platform Enumeration (CPE) name of the software update to facilitate efficient searching functions, and its digital identity embedded into the shortchain. So rather than one single long chain, where one could skip links to save time, the SSAE system 110 instead allows a client to start from any of multiple shortchains to essentially "skip" or bypass non-relevant updates without compromising the cryptographic proof of the software-update-chain.

Some other known digital resource downloading systems allow entities to provide their own "identity notarizations" when skipping through software update chains. However, this inclusion of an identity check of the blockchain source inside the blockchain without an independent identity source-channel opens up the system for the potential of a spoof/forged attack by an adversary if they gained unauthorized access to multiple components/accounts of the system. In contrast, the SSAE system 110 uses an independent system outside of the blockchain to validate identity. This independent system is the authoritative DNS. By having the software developer establish their own authoritative DNS server domain under their exclusive control, the software developer is able to provide a DNS identity verification system which is secure, interlocking, transparent, and which essentially solves the "identity" problem inherent with blockchain (anonymous users behind hashes sending updates to the blockchain).

Some other known digital resource downloading systems utilize smart contracts to control who gains access to the software by releasing keys to decrypt modules of the software after meeting policy requirements. Such systems control access by encrypting certain modules of the software update, and only decrypt them after access has been granted through the smart contracts. Unlike these systems, the SSAE system 110 has encrypted DNS text records which are decrypted to cryptographically "prove" the software update and the identity of the author/source. These do not decrypt the software update, nor is it required to decrypt the DNS text records to use the software update.

Some other known digital resource downloading systems allow "untrusted" entities to share the software update to other parties. In the SSAE system 110, an entity given access to the blockchain data, DNS, and the software binary would be able to share, use, and verify the software update despite having never downloaded it directly from the original blockchain, which makes it resilient to disruptions, attacks or technological failures of the DLT network/infrastructure. It follows that the software update is still available, functional and protected in the SSAE system 110.

Figure 7:
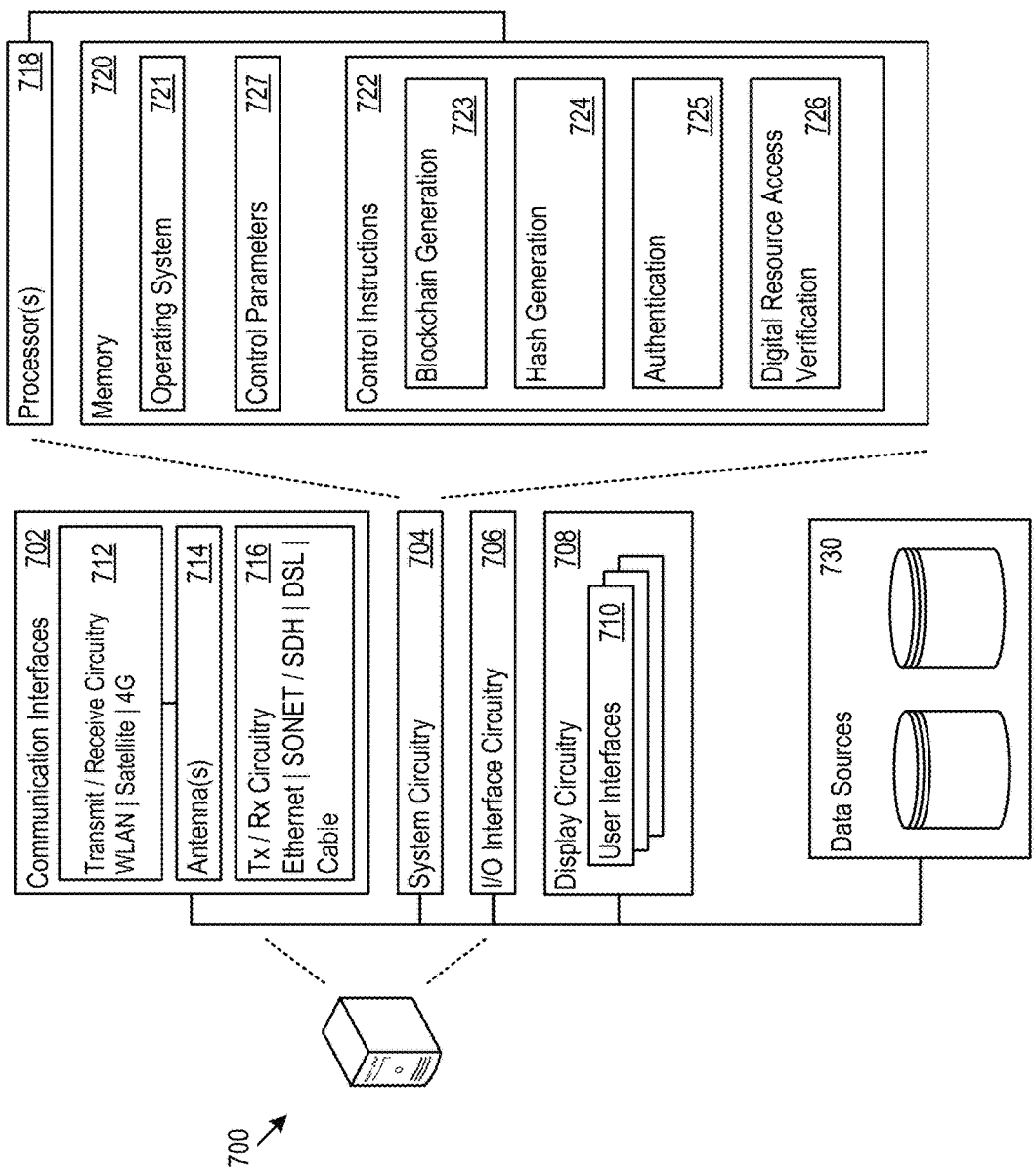
FIG. 7 shows an exemplary computer architecture for a computer device, according to some embodiments.

FIG. 7 illustrates an exemplary computer architecture of a computer device 700 on which one or more features of the SSAE system 110 may be executed. The computer device 700 includes communication interfaces 702, system circuitry 704, input/output (I/O) interface circuitry 706, and display circuitry 708. The graphical user interfaces (GUIs) 710 displayed by the display circuitry 708 may be representative of GUIs generated by the SSAE system 110. The graphical user interfaces (GUIs) 710 displayed by the display circuitry 708 may also be representative of GUIs generated by the SSAE system 110. The GUIs 710 may be displayed locally using the display circuitry 708, or for remote visualization, e.g., as HTML, JavaScript, audio, and video output for a web browser running on a local or remote machine. Among other interface features, the GUIs 710 may further render displays relating to the blockchain generation process.

The GUIs 710 and the I/O interface circuitry 706 may include touch sensitive displays, voice or facial recognition inputs, buttons, switches, speakers and other user interface elements. Additional examples of the I/O interface circuitry 706 includes microphones, video and still image cameras, headset and microphone input/output jacks, Universal Serial Bus (USB) connectors, memory card slots, and other types of inputs. The I/O interface circuitry 706 may further include magnetic or optical media interfaces (e.g., a CDROM or DVD drive), serial and parallel bus interfaces, and keyboard and mouse interfaces.

The communication interfaces 702 may include wireless transmitters and receivers ("transceivers") 712 and any antennas 714 used by the transmit and receive circuitry of the transceivers 712. The transceivers 712 and antennas 714 may support WiFi network communications, for instance, under any version of IEEE 802.11, e.g., 802.11n or 802.11ac, or other wireless protocols such as Bluetooth, Wi-Fi, WLAN, cellular (4G, LTE/A). The communication interfaces 702 may also include serial interfaces, such as universal serial bus (USB), serial ATA, IEEE 1394, lighting port, I$^2$C, slimBus, or other serial interfaces. The communication interfaces 702 may also include wireline transceivers 716 to support wired communication protocols. The wireline transceivers 716 may provide physical layer interfaces for any of a wide range of communication protocols, such as any type of Ethernet, Gigabit Ethernet, optical networking protocols, data over cable service interface specification (DOCSIS), digital subscriber line (DSL), Synchronous Optical Network (SONET), or other protocol.

The system circuitry 704 may include any combination of hardware, software, firmware, APIs, and/or other circuitry. The system circuitry 704 may be implemented, for example, with one or more systems on a chip (SoC), application specific integrated circuits (ASIC), microprocessors, discrete analog and digital circuits, and other circuitry. The system circuitry 704 may implement any desired functionality of the SSAE system 110. As just one example, the system circuitry 704 may include one or more instruction processor 718 and memory 720.

The memory 720 stores, for example, control instructions 722 for executing the features of the SSAE system 110, as well as an operating system 721. In one implementation, the processor 718 executes the control instructions 722 and the operating system 721 to carry out any desired functionality for the SSAE system 110, including those attributed to blockchain generation 723, hash generation 724, authentication 725, and/or digital resource access verification 726. The control parameters 727 provide and specify configuration and operating options for the control instructions 722, operating system 721, and other functionality of the computer device 700.

The computer device 700 may further include various data sources 730. The data sources 730 may include databases for storing blockchain information.

The computer device 700 may be representative of one or more computer devices operated to implement the features of the SSAE 110.

Various implementations have been specifically described. However, other implementations that include a fewer, or greater, number of features and/or components for each of the apparatuses, methods, or other embodiments described herein are also possible.

What is claimed is:

1. A computing system comprising:
    a record keeping server configured to:
        store a digital record for a software update; and
    a computing device comprising:
        an authentication circuitry configured to:
            generate a public key corresponding to a software developer of the software update;
            generate a private key corresponding to the software developer of the software update;
            establish a software-signing certificate corresponding to the software update; and
            electronically sign the software update with the software-signing certificate;
        a blockchain generation circuitry configured to:
            generate a genesis block that initiates a blockchain; and
            generate a block for the blockchain, wherein the block is configured to include:
                a hashed list of components comprising a digital resource;
                a hashed data file corresponding to data associated with the digital resource; and
                a hashed resource file corresponding to at least a portion of the digital resource;
    wherein
        the record keeping server is further configured to:
            receive the blockchain from the computing device; and
            publish the blockchain; and
        the hashed data file is a three-way hash of the software-signing certificate and a file size of the digital resource.

2. The computing system of claim 1, wherein the authentication circuitry is further configured to:
    encrypt the software-signing certificate using the private key.

3. The computing system of claim 1, wherein the record keeping server is an authoritative domain name system (DNS) server.

4. The computing system of claim 1, wherein the digital resource is assigned a digital identity according to a common platform enumeration (CPE) schema.

5. The computing system of claim 1, wherein the genesis block is configured to store at least the software-signing certificate encrypted with the private key, the public key, a digital identity of the digital resource, and a DNS record corresponding to the software developer.

6. The computing system of claim 1, wherein the hashed list of components is a bill of material (BOM) including a list of each component of the digital resource.

7. The computing system of claim 1, wherein the hashed resource file includes a digital identity of the digital resource, an identity of the digital record, the software-signing certificate, and the digital resource.

8. The computing system of claim 1, wherein the blockchain stores a distinct software update as the digital resource.

9. A method comprising:
    storing, by a record keeping server, a digital record for a software update;
    generating, by an authentication circuitry, a public key corresponding to a software developer of the software update;
    generating, by the authentication circuitry, a private key corresponding to the software developer of the software update;
    establishing, by the authentication circuitry, a software-signing certificate corresponding to the software update;
    electronically signing, by the authentication circuitry, the software update with the software-signing certificate;
    generating, by a blockchain generation circuitry, a genesis block that initiates a blockchain; and
    generating, by the blockchain generation circuitry, a block for the blockchain, wherein
        the block is configured to include:
            a hashed list of components comprising a digital resource;
            a hashed data file corresponding to data associated with the digital resource;

a hashed resource file corresponding to at least a portion of the digital resource;

the hashed data file is a three-way hash of the software-signing certificate and a file size of the digital resource;

receiving, by the record keeping server, the blockchain from the blockchain generation circuitry; and publishing, by the record keeping server, the blockchain.

10. The method of claim 9, further comprising:
encrypting, by the authentication circuitry, the software-signing certificate using the private key.

11. The method of claim 9, wherein the record keeping server is an authoritative domain name system (DNS) server.

12. The method of claim 9, wherein the digital resource is assigned a digital identity according to a common platform enumeration (CPE) schema; and
wherein the blockchain stores a distinct software update as the digital resource.

13. The method of claim 9, wherein the genesis block is configured to store at least the software-signing certificate encrypted with the private key, the public key, a digital identity of the digital resource, and a DNS record corresponding to the software developer.

14. The method of claim 9, wherein the hashed list of components is a bill of material (BOM) including a list of each component of the digital resource.

15. The method of claim 9, wherein the hashed resource file includes a digital identity of the digital resource, an identity of the digital record, the software-signing certificate, and the digital resource.

16. A computing device comprising:
a machine-readable medium, other than a transitory signal; and
instructions stored on the machine-readable medium, the instructions configured to, when executed, cause processing circuitry to:
store, in a record keeping server, a digital record for a software update;
generate a public key corresponding to a software developer of the software update;
generate a private key corresponding to the software developer of the software update;
establish a software-signing certificate corresponding to the software update;
electronically sign the software update with the software-signing certificate;
generate a genesis block that initiates a blockchain; and
generate a block for the blockchain, wherein
the block is configured to include:
a hashed list of components comprising a digital resource;
a hashed data file corresponding to data associated with the digital resource, wherein
the hashed data file is a three-way hash pf the software-signing certificate and a file size of the digital resource; and
a hashed resource file corresponding to at least a portion of the digital resource; and
publish the blockchain.

17. The computing device of claim 16, wherein the genesis block is configured to store at least the software-signing certificate encrypted with the private key, the public key, a digital identity of the digital resource, and a DNS record corresponding to the software developer.

18. The computing device of claim 16,
wherein the hashed list of components is a bill of material (BOM) including a list of each component of the digital resource;
wherein the hashed data file is a three-way hash of the software-signing certificate and a file size of the digital resource; and
wherein the hashed resource file includes a digital identity of the digital resource, an identity of the digital record, the software-signing certificate, and the digital resource.

* * * * *

UNITED STATES PATENT AND TRADEMARK OFFICE
CERTIFICATE OF CORRECTION

| | |
|---|---|
| PATENT NO. | : 11,336,463 B2 |
| APPLICATION NO. | : 16/545687 |
| DATED | : May 17, 2022 |
| INVENTOR(S) | : Alireza Salimi et al. |

It is certified that error appears in the above-identified patent and that said Letters Patent is hereby corrected as shown below:

In the Specification

In Column 13, Line 2, please insert -- and -- after the ";".

In Column 14, Line 16, please delete "pf" and insert -- of --.

Signed and Sealed this
Ninth Day of August, 2022

*Katherine Kelly Vidal*

Katherine Kelly Vidal
*Director of the United States Patent and Trademark Office*